(12) United States Patent
Doi et al.

(10) Patent No.: US 6,456,728 B1
(45) Date of Patent: Sep. 24, 2002

(54) OBJECT DETECTION APPARATUS, MOTION CONTROL APPARATUS AND PATTERN RECOGNITION APPARATUS

(75) Inventors: Miwako Doi, Kawasaki; Akira Morishita, Tokyo; Naoko Umeki, Kawasaki; Shunichi Numazaki, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/236,574

(22) Filed: Jan. 26, 1999

(30) Foreign Application Priority Data

Jan. 27, 1998 (JP) .......................................... 10-014029

(51) Int. Cl.[7] .................................................. G06K 9/00
(52) U.S. Cl. ........................ 382/103; 382/190; 348/169
(58) Field of Search ................................ 382/103, 107, 382/165, 190, 106, 169, 274, 100; 348/169

(56) References Cited

U.S. PATENT DOCUMENTS

| | | | | |
|---|---|---|---|---|
| 5,151,945 A | * | 9/1992 | Lee et al. ................... | 382/103 |
| 5,751,838 A | * | 5/1998 | Cox et al. ................... | 382/107 |
| 5,900,863 A | * | 5/1999 | Numazaki et al. .......... | 345/158 |
| 6,072,903 A | * | 6/2000 | Makai et al. ................ | 382/190 |
| 6,141,105 A | * | 10/2000 | Yahashi et al. ............. | 356/376 |

* cited by examiner

*Primary Examiner*—Leo Boudreau
*Assistant Examiner*—Barry Choobin
(74) *Attorney, Agent, or Firm*—Oblon, Spivak, McClelland, Maier & Neustadt, P.C.

(57) ABSTRACT

The present invention provides an object detection apparatus which includes an image capture section for capturing a distance image indicating distance information to a subject and representing intensity distribution of light reflected by the subject and a detection section for detecting one of a target object and/or a motion of the target object from the distance image captured by the image capture section. The present invention also provides a motion control apparatus for controlling a motion of an object such as a toy. The motion control apparatus includes an image capture section for capturing a distance image indicating distance information to a subject and representing intensity distribution of light reflected by the subject, a detection section for detecting one of a target object and/or a motion of the target object from the distance image captured by the image capture section, and a control section for controlling a motion of an object based on a result of detection of the detection section. The present invention also provides a pattern recognition apparatus which is capable of robustly recognizing a pattern at high speed and which can easily be miniaturized.

18 Claims, 10 Drawing Sheets

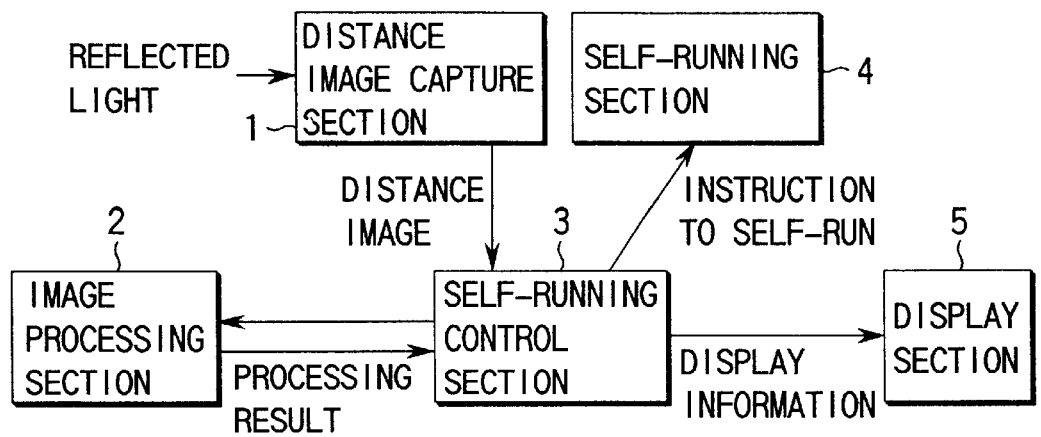
FIG. 1
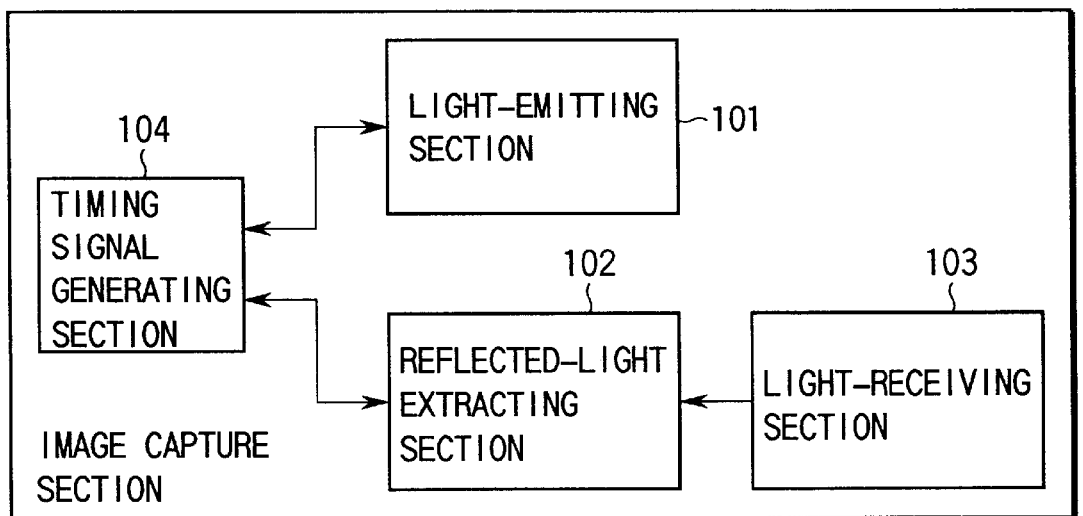
FIG. 2
| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 255 | 0 | 0 | 0 | 0 | 0 |
| 0 | 0 | 250 | 0 | 0 | 0 | 0 | 0 |
| 0 | 0 | 250 | 0 | 0 | 0 | 0 | 0 |
| 0 | 220 | 250 | 0 | 220 | 0 | 0 | 0 |
| 0 | 220 | 220 | 0 | 220 | 0 | 0 | 0 |
| 0 | 220 | 220 | 200 | 200 | 0 | 0 | 0 |
FIG. 3

OBJECT DETECTION APPARATUS, MOTION CONTROL APPARATUS AND PATTERN RECOGNITION APPARATUS

BACKGROUND OF THE INVENTION

The present invention relates to an object detection apparatus incorporated into a robot, a toy, and a stuffed animal or doll, which runs in accordance with a person's motion and repeats its predetermined motion.

Conventionally, infrared rays, supersonic waves and sound have been used in order to move a toy or a stuffed animal or doll in response to a person's motion. The infrared rays are the same as those for operating an automatic door.

In the object detection apparatus employing the infrared rays, one approaches the apparatus and blocks one of the infrared rays emitted therefrom. In this apparatus, even when a person approaches a toy or a stuffed animal or doll without any intention of moving it, he or she blocks an infrared ray to cause the toy or the stuffed animal or doll to respond in vain. Since, furthermore, a predetermined distance is required between a source for emitting the infrared rays and that for receiving them, the apparatus cannot be miniaturized.

In the object detection apparatus using the supersonic waves, when a person approaches a toy or a stuffed animal or doll, the supersonic waves are generated from the toy or the stuffed animal or doll and reflected by the person to thereby detect the person who is approaching. Since, however, this apparatus also detects only whether the supersonic waves are blocked or not as in the case of using the infrared rays, even when the person approaches a toy without any intention of moving it, the toy responds in vain.

According to the object detection apparatus using sound, sound is sensed by a small-sized microphone attached to a toy and converted to an electrical signal to move the toy. As in the case of using infrared rays and supersonic waves, this apparatus detects only whether the sound is blocked or not. If, therefore, one makes a sound without any intention of moving it, the toy responds in vain.

On the other hand, in a self-running apparatus incorporated into a robot such as a cleaning robot which senses an obstacle and runs avoiding it, one or both of a sensing method using supersonic waves and a sensing method using image processing is employed.

According to the former method, the apparatus generates ultrasonic waves from two portions to measure a distance to an object or an obstacle therefrom, like the triangular surveying, with the result that the obstacle can be sensed with high precision, though this method is more expensive than a toy. In this method, however, the presence of the obstacle can be known but the size or shape thereof cannot be obtained. It is thus difficult to plan how to avoid the obstacle. Therefore, a map of the area where the robot moves is stored in advance, and the position of a sensed object on the map is assumed from the location and direction of the robot itself, thus making a plan for the robot to move. Consequently, the sensing method using the supersonic waves cannot be practiced so well in the area whose map is not stored in advance.

Moreover, there is a method of recognizing an object, existing in which direction a robot is headed, by analyzing an image captured by an image capture apparatus such as a CCD camera. In this method, first, an image of the object in the direction is captured by the image capture apparatus, and then pre-processing of removing an extra portion such as a background from the image and to cut out only the object to be recognized as an obstacle. After that, the shape of the object is recognized using the processed image.

The above pre-processing of cutting out the object to be recognized will now be described. In order to cut only the image of a target object out of the image captured by the camera, any difference between an image region of the object and that of the others is employed as a clue. There are two image cutting methods utilizing a variation in hue and utilizing a differential image. In the former method, a portion of an image having a wide difference in hue is extracted and subjected to thinning to extract an edge. In the case of a room, the edge corresponds to the boundary between a wall and a pillar and that between a door, a floor and a wall. These boundaries are inclined in the depth direction toward a disappearing point, but basically they are recognized as vertical and horizontal lines. When these lines are disturbed, it is determined that there is an obstacle other than the structures such as the door, floor and wall. It is however difficult to clearly distinguish the floor, wall and door from one another if their hues are close or they have conspicuous stains. Since a tone of color varies with lighting, it is difficult to cut out an image in a steady state. Since, furthermore, no lighting makes a captured image dark completely, it is difficult even for persons to recognize an object from its photograph taken in the dark.

There is another method of cutting an object to be recognized out of a captured image, in which a motion vector between frames of the image is calculated to analyze an object in motion. When the number of objects in motion is small, no problems occur; however, if a large number of objects are moving, the number of vectors is increased suddenly and so is a load for calculating the motion vectors between the frames, with the result that the objects cannot be detected in real time.

To compensate for the above method using only the image processing, it is employed together with a distance calculation method using supersonic waves. In this method, however, points are observed and thus it is difficult to acquire information for all images captured as a plane.

As described above, in the conventional method for analyzing an image captured by image capture means, the flow of the analysis and the information to be analyzed are fixed; therefore, when the image is varied with external conditions every moment, a load is applied to a specific processing section, and the information analysis cannot follow the variation.

One method for resolving the above problem is to use a high-performance computer and a high-speed transmission system so as to allow real-time object detection processing (e.g., 30 images per second) in spite of an increase in load. It is however difficult to incorporate such a high-performance computer into a small-sized apparatus such as a toy, let alone a robot.

In the above-described conventional object detection apparatus for detecting an object itself and its motion using image processing, an inexpensive and robust image analysis is difficult to conduct under the external conditions varying every moment. In order to do so, a high-performance computer and a high-speed transmission system are used and thus costs therefor are too high, and they can be used neither in a simple automatic apparatus having intensive functions of a robot, a stuffed animal or doll, and a toy which runs avoiding an obstacle or acts according to a person's motion nor in a wearable object detection apparatus for, when the blind walk, detecting an obstacle in place of their eyes.

When the foregoing object detection apparatus is incorporated into playing equipment such as a boxing game, a user is so absorbed therein that he or she is likely to hit and break the apparatus by mistake. Moreover, the user's hand or body partly falls within a limited image capture range in which an image can be captured and thus a normal image cannot be obtained.

BRIEF SUMMARY OF THE INVENTION

An object of the present invention is to provide an object detection apparatus which is capable of robustly detecting an object at high speed and which can easily be miniaturized, and a motion control apparatus and a pattern recognition apparatus both using the object detection apparatus.

In order to attain the above object, an object detection apparatus according to a first aspect of the present invention comprises image capture means for capturing a distance image indicating distance information to a subject and representing intensity distribution of light reflected by the subject, and detection means for detecting one of a target object and/or a motion of the target object from the distance image captured by the image capture means.

According to the present invention, the motion control apparatus is capable of high-speed, robust object detection and can easily be miniaturized.

Preferably, the image capture means is provided so as to prevent the subject from falling within a limited image capture range and so as not to collide with the subject. If, therefore, the object detection apparatus is applied to recreational facilities such as an experience-type game, not only the distance image capture means can be prevented from being hit or broken by mistake, but also an object such as a user's hand, body and bat does not prevent normal processing because the object does not fall within the limited image capture range.

An object detection apparatus according to a second aspect of the present invention comprising at least one first image capture means for capturing a distance image indicating distance information to a subject and representing intensity distribution of light reflected by the subject, at least one second image capture means for capturing an image which differs in property from the distance image, and detection means for detecting one of a target object and/or a motion of the target object based on the image captured by at least one of the first image capture means and the second image capture means.

Preferably, the first image capture means and the second image capture means vary from each other in image capture range.

Preferably, the image captured by the second image capture means is a two-dimensional image.

According to the present invention, the motion control apparatus is capable of high-speed, robust object detection and can easily be miniaturized. In order to distinguish an object in the distance or acquire color information, its corresponding image is captured by the second image capture means and combined with a distance image to detect a target object or a motion thereof. The precision of detection can thus be increased more greatly.

An object detection apparatus according to a third aspect of the present invention comprises a plurality of image capture means for capturing a distance image indicating distance information to a subject and representing intensity distribution of light reflected by the subject, and detection means for detecting one of a target object and/or a motion of the target object based on the distance image captured by at least one of the plurality of image capture means.

Preferably, the plurality of image capture means vary from one another in image capture range.

Preferably, the plurality of image capture means vary from one another in image capture direction.

According to the present invention, the motion control apparatus is capable of high-speed, robust object detection and can easily be miniaturized. In order to detect an object in the distance and that in the neighborhood, the plurality of image capture means are used selectively to detect the objects with higher precision.

An object detection apparatus according to a fourth aspect of the present invention comprises image capture means for capturing a distance image indicating distance information to a subject and representing intensity distribution of light reflected by the subject, detection means for detecting one of a target object and/or a motion of the target object from the distance image captured by the image capture means, and alarm generation means for generating an alarm when the detection means detects one of the target object and the motion of the target object.

Preferably, the object detection apparatus is wearable.

A motion control apparatus according to the present invention comprises image capture means for capturing a distance image indicating distance information to a subject and representing intensity distribution of light reflected by the subject, detection means for detecting one of a target object and/or a motion of the target object from the distance image captured by the image capture means, and control means for controlling a motion of an object based on a result of detection of the detection means.

According to the above invention, a motion of an object such as a small-sized toy and a wheelchair can be controlled simply and inexpensively using an object detection apparatus which is capable of high-speed, robust object detection and which can easily be miniaturized.

Another motion control apparatus according to the present invention comprises at least one first image capture means for capturing a distance image indicating distance information to a subject and representing intensity distribution of light reflected by the subject, at least one second image capture means for capturing an image which differs in property from the distance image, detection means for detecting one of a target object and/or a motion of the target object based on the image captured by at least one of the first image capture means and the second image capture means and control means for controlling a motion of an object based on a result of detection of the detection means.

Preferably, the first image capture means and the second image capture means vary from each other in image capture range.

Preferably, the image captured by the second image capture means is a two-dimensional image.

According to the above invention, a motion of an object such as a small-sized toy and a wheelchair can be controlled simply and inexpensively using an object detection apparatus which is capable of high-speed, robust object detection and which can easily be miniaturized. In order to distinguish an object in the distance or acquire color information, its corresponding image is captured by the second image capture means and combined with a distance image to detect a target object or a motion thereof. The precision of detection can thus be increased more greatly.

Still another motion control apparatus according to the present invention comprises a plurality of image capture means for capturing a distance image indicating distance information to a subject and representing intensity distribution of light reflected by the subject, detection means for detecting one of a target object and/or a motion of the target object based on the distance image captured by at least one of the plurality of image capture means, and control means for controlling a motion of an object based on a result of detection of the detection means.

Preferably, the plurality of image capture means vary from one another in image capture range.

Preferably, the plurality of image capture means vary from one another in image capture direction.

According to the above invention, a motion of an object such as a small-sized toy and a wheelchair can be controlled simply and inexpensively using an object detection apparatus which is capable of high-speed, robust object detection and which can easily be miniaturized. In order to detect an object in the distance and that in the neighborhood, the plurality of image capture means are used selectively to detect the objects with higher precision.

A pattern recognition apparatus according to the present invention comprises image capture means for capturing a distance image indicating distance information to a subject and representing intensity distribution of light reflected by the subject and recognition means for recognizing a predetermined pattern from the distance image captured by the image capture means based on the distance image and reflectivity of the subject.

According to the above invention, the pattern recognition apparatus is capable of robustly recognizing a pattern at high speed and can easily be miniaturized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram illustrating an example of the constitution of a motion control apparatus according to a first embodiment of the present invention;

FIG. 2 is a block diagram illustrating an example of the constitution of a distance image capture section of the motion control apparatus shown in FIG. 1;

FIG. 3 is a table showing an example of a distance image in matrix where the intensity of reflected light is represented by pixel values;

DETAILED DESCRIPTION OF THE INVENTION

Figure 4:
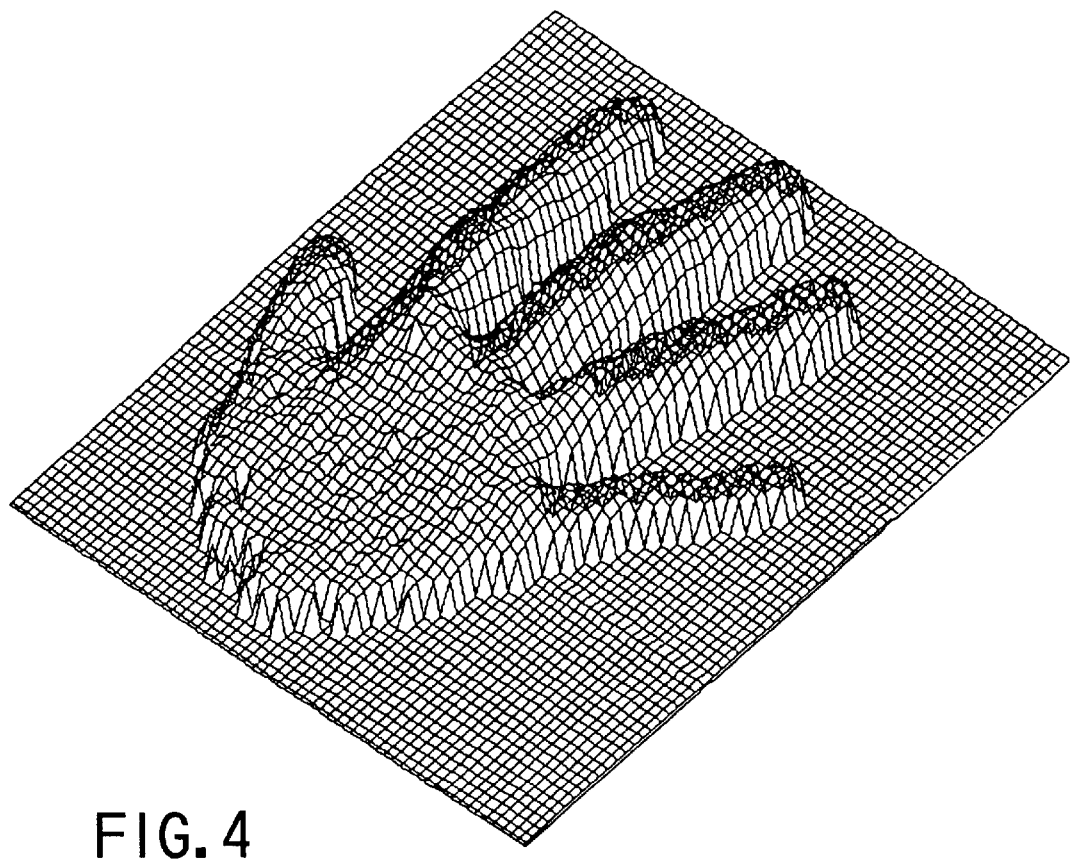
FIG. 4 is a view showing the distance image of FIG. 3 three-dimensionally.

Embodiments of the present invention will now be described with reference to the accompanying drawing.

First Embodiment

FIG. 1 is a block diagram of an example of the constitution of a motion control apparatus employing an object detection apparatus according to a first embodiment of the present invention. In the first embodiment, the motion control apparatus is incorporated into a robot which detects a predetermined target object from a distance image and self-runs keeping a predetermined interval between the robot and target object.

Referring to FIG. 1, the motion control apparatus includes a distance image capture section 1, an image processing section 2, a self-running control section 3, a self-running section 4, and a display section 5.

The distance image capture section 1 receives reflected light to capture a distance image. This is described in detail in U.S. patent application Ser. No. 08/935,667 which has been filed by the same applicant as that of the present application.

The image processing section 2 analyzes the distance image captured by the section 1 to extract a target object and calculate a distance thereto.

The self-running control section 3 sets and indicates parameters of self-running to the self-running section 4 based on the analysis results of the image processing section 2.

The self-running section 4 is a mechanical one for actually moving and rotating the robot in response to an instruction from the self-running control section 3.

The display section 5 is constituted of, e.g., a small-sized liquid crystal panel for displaying a result of image processing and a status of self-running.

The distance image capture section 1 and the distance image captured by the section 1 will now be described in brief.

As illustrated in FIG. 2, the distance image capture section 1 is constituted chiefly of a light-emitting section 101, a reflected-light extracting section 102, a light-receiving section 103, and a timing signal generating section 104.

The light-emitting section 101 emits light the intensity of which varies with time in response to a timing signal generated from the timing signal generating section 104. This light is applied to a target object located ahead of the light-emitting section 101.

The light-receiving section 103 detects an amount of light which is emitted from the section 101 and then reflected by the target object.

The reflected-light extracting section 102 extracts spatial intensity distribution of the reflected light received by the light-receiving section 103. Since the distribution can be considered to be an image, it is called a distance image hereinafter.

The light-receiving section 103 usually receives external light, such as illumination and sunlight, as well as the above light reflected by the target object. The reflected-light extracting section 102 calculates in advance a difference between an amount of light received when the light-emitting section 101 emits light and an amount of light received when the section 101 does not do it. The difference is extracted from an amount of actually received light to take out only the components of light reflected by the target object.

The reflected-light extracting section 102 extracts the intensity distribution of the reflected light received by the light-receiving section 103 or the distance image shown in FIG. 3.

For simple description, FIG. 3 shows a distance image of 8×8 pixels which is part of that of 256×256 pixels.

The light reflected by the object reduces greatly as the distance from the light-receiving section 103 to the object increases. When light is emitted uniformly from the surface of the object, an amount of light received by each pixel of the distance image decreases inversely with the square of the distance from the section 103 to the object. Thus, the value of each pixel of the distance image shown in FIG. 3 represents the distance. For this reason, the image shown in FIG. 3 is called a distance image.

The value of each pixel of the distance image also represents an amount of light reflected by the object and received by a unit light-receiving section corresponding to the pixel. The reflected light is influenced by the property of the object (mirror-face reflection, emission, and absorption of light, etc.), the direction thereof, the distance thereto, and its amount is closely related to the distance to the object if the object is one from which light is emitted uniformly. For example, one's hands correspond to such an object; therefore, if a user reaches out his or her hand in front of the distance image capture section 1, a three dimensional image as shown in FIG. 4, which reflects the distance to the hand, the inclination thereof and the like, can be captured from the distance image.

Figure 5A:
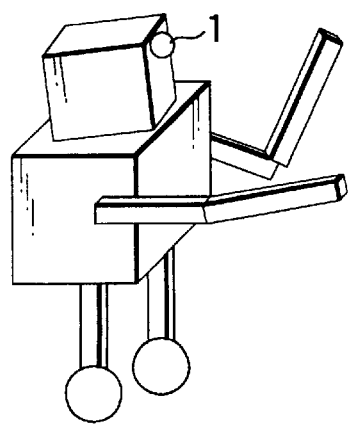
FIG. 5A is a view of the outward appearance of a robot as an example of the motion control apparatus illustrated in FIG. 1.
Figure 5B:
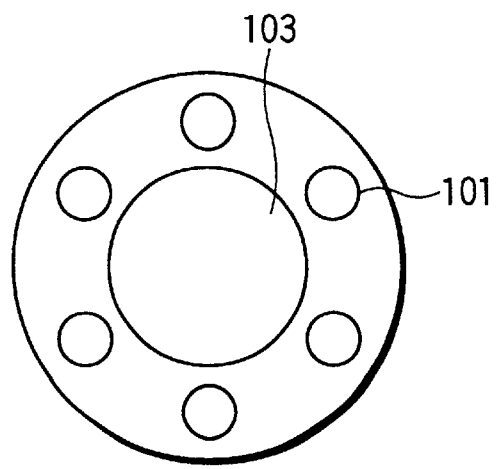
FIG. 5B is a view of an example of a light-receiving section of the distance image capture section incorporated into an eye of the robot shown in FIG. 5A.
Figure 6:
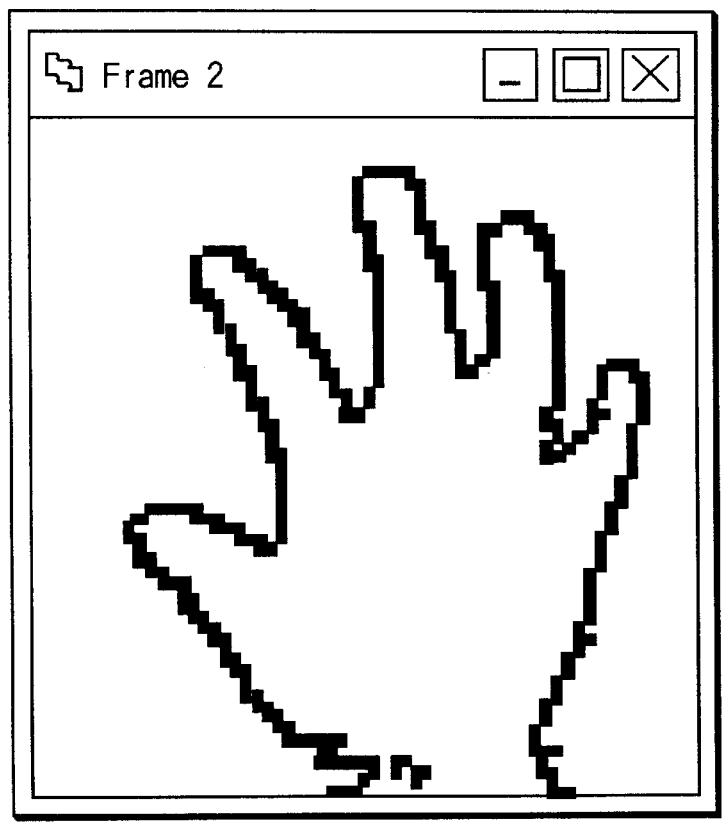
FIG. 6 is a view of an example of a contour image of an object extracted from the distance image.

Let us return to the description of the first embodiment. FIG. 5A is a view of the outward appearance of a robot into which the motion control apparatus illustrated in FIG. 1 is incorporated, and FIG. 5B is an enlarged view of an eye of the robot. The eye is provided with the light-emitting sections 101 and light-receiving section 103 of the image capture section 1.

In FIG. 5B, the light-receiving section 103 is located in the central part of the eye and constituted of a circular lens and an area sensor (not shown) behind the lens, and the light-emitting sections 101 (e.g., six section in FIG. 5B) are arranged at regular intervals around the circular lens and each constituted of an LED for emitting light such as infrared rays.

The light emitted from the light-emitting sections 101 is reflected by an object, condensed by the lens of the light-receiving section 103, and received by the area sensor thereof. The area sensor includes 256×256 sensors arranged in matrix, and the intensity of reflected light received by each of the sensors represents a pixel value. The image so captured corresponds to the distance image shown as the intensity distribution of reflected light in FIG. 3.

As described above, FIG. 3 shows part of distance image data (8×8 pixels of 256×256 pixels). Each of (pixel) values in cells of the matrix represents the intensity of reflected light with a 256-level gradation. For example, a cell having a value of "255" indicates a portion of the target object which is the closest to the image capture section 1, while a cell having a value of "0" shows that reflected light does not reach the section 1 and that there are no target objects.

FIG. 4 is a view three-dimensionally showing the entire distance image data in matrix. The distance image data represents a one's hand.

An image processing operation of the motion control apparatus having the constitution as shown in FIG. 1, which is incorporated into the robot illustrated in FIG. 5A, will now be described with reference to the flowchart of FIG. 8.

First, when power is turned on to start the apparatus in response to an instruction, a rotational flag I is set to "0" to initialize the apparatus (step S1). After that, using the light-emitting sections 101 and light-receiving section 103 as shown in FIG. 5B, the distance image capture section 1 captures, for example, 30 distance images (the same number as that of the normal video images) per second (step S2), with the result that the distance image as shown in FIG. 3 is sent to the image processing section 2.

The section 2 generates contour information of a captured image, except for cells having pixel values which are not higher than a predetermined one (step 3).

In order to generate the contour information, the pixel values of adjacent pixels in the distance image are compared with each other, a constant is assigned to the pixel values which are higher than a fixed one $\alpha$, and continuous pixels having such values have only to be extracted.

More specifically, if the pixel value of the i-th row and j-th column (i, j) is expressed as P(i, j) and that of contour information of an object is expressed as R(i, j), the contour information having a pixel value of "255" can be obtained from the following formula:

When $\{P(i, j)-P(i-1, j)\}>\alpha$, $\{P(i, j)-P(i, j-1)\}>\alpha$, $\{P(i, j)-P(i+1, j)\}>\alpha$, and $\{P(i, j)-P(i, j+1)\}>\alpha$, R(i, j)=255. Except for these conditions, R(i, j)=0.

If the contour information is extracted from the distance image, the image processing section 2 determines whether the extracted information is contour information of a target object to be recognized.

Figure 7:
FIG. 7 is a view of patterns registered in a recognition dictionary stored in an image processing section of the motion control apparatus shown in FIG. 1.
Figure 7:

The image processing section 2 has a recognition dictionary in which the shape patterns of an object to be recognized are stored in such a manner as shown in FIG. 7. By matching of the patterns stored in the dictionary and the above contour information, the section 2 determines whether the extracted contour information corresponds to the target object (step S4).

The shape pattern of a predetermined target object (or shape patterns corresponding to the motion of an object) to be recognized is previously stored in the recognition dictionary.

If one of the patterns stored in the dictionary coincides with the extracted contour information, then distance d from the distance image capture section 1 to the target object is calculated and, in this case, the rotational flag I is cleared to "0" (step S5).

To calculate the distance d, a representative pixel value of an image of the target object is first obtained from the distance image. As the representative pixel value, a neighborhood value is used, though there are some values such as an average value. The intensity of light reflected by the target object decreases inversely with the square of the distance to the object. In other words, the relationship between the distance d from the section 1 to the target object and the pixel value of the pixel of the target object can be given by the following equation (1) when the representative pixel value of the image of the target object is Q(i, j):

$$Q(i, j) = K/d^2 \quad (1)$$

where K is a coefficient which is so adjusted that R(i, j) is "255" when d=0.5 m. The distance d can be obtained from the above equation (1).

The self-running control section 3 controls the self-running section 4 based on the distance d obtained by the image processing section 2.

If the distance d is smaller than distance D which is preset between the distance image capture section 1 and the target object, it can be determined that the robot as shown in FIG. 5A, incorporating the motion control apparatus, falls within a range corresponding to a predetermined distance from the target object (step S6). The self-running control section 3 thus returns to step S2 without any control of the self-running section 4 and continues its distance image capture operation.

If the distance d is larger than the distance D, it is determined that the robot is moved away from the target object and, in this case, the self-running control section 3 provides the self-running section 4 with an instruction to advance by a difference (d−D) (step S7). In response to the instruction, the self-running section 4 is driven to move the robot forward. The display section 5 thus displays that the distance between the robot and target object has reached the predetermined distance D (step S8). After that, the flow is returned to step S2, and the above image capture operation is continued until an instruction to complete the operation (step S9).

If, in step S4, the recognition dictionary includes no patterns coinciding with the extracted contour information and thus a target object to be recognized cannot be detected, the robot rotates around the object. In this case, "1" is added to the rotational flag I first (step S10).

When an angle of one rotation is 30 degrees, if the rotational flag I exceeds "12," the robot rotates around the object once. If the robot cannot detect the target object in spite of its rotating operation, the result is displayed on the display section 5 to complete the processing (step S11).

If, in step S11, the rotational flag I is smaller than "12," the flow advances to step S12, and the self-running control section 3 provides the self-running section 4 with an instruction to rotate the robot. Whenever the instruction is provided, the robot rotates in one direction by 30 degrees. Then, the flow returns to step S2 to continue the same distance image capture operation. The robot rotates so as to look around its surroundings until it detects a target object in the distance image, to capture an image and search for the target object.

In order to give an instruction to complete the processing in step S9, not only a predetermined operation is performed, but also the eye of the robot can be covered to cut off the light received by the light-receiving section 103, thus stopping the robot.

According to the first embodiment described above, by the use of a distance image (three-dimensional image) by which distance information to the target object as well as the shape of the target object, the image processing can be simplified more than the prior art operation for processing an image captured by a CCD camera or the like, a robust object can be detected at high speed, and the entire apparatus can easily be miniaturized.

In the foregoing first embodiment, the motion control apparatus shown in FIG. 1 is incorporated into a robot having such a shape as shown in FIG. 5A. The present invention is not limited to this. For example, the motion control apparatus can be incorporated into a dog-shaped robot and the robot is set so as to be always located on the left side of its owner. Moreover, the motion control apparatus can be incorporated into a ball-shaped robot to constitute a toy which rotates and follows the dog owner.

In both the above two robots, the self-running control section 3 has only to control the self-running section 4 in such a manner that the image capture range of the distance image is adjusted so as to fall within a predetermined one or the rotational angle is defined to detect a target object (e.g., a owner) in the distance image captured within the image capture range.

Figure 9:
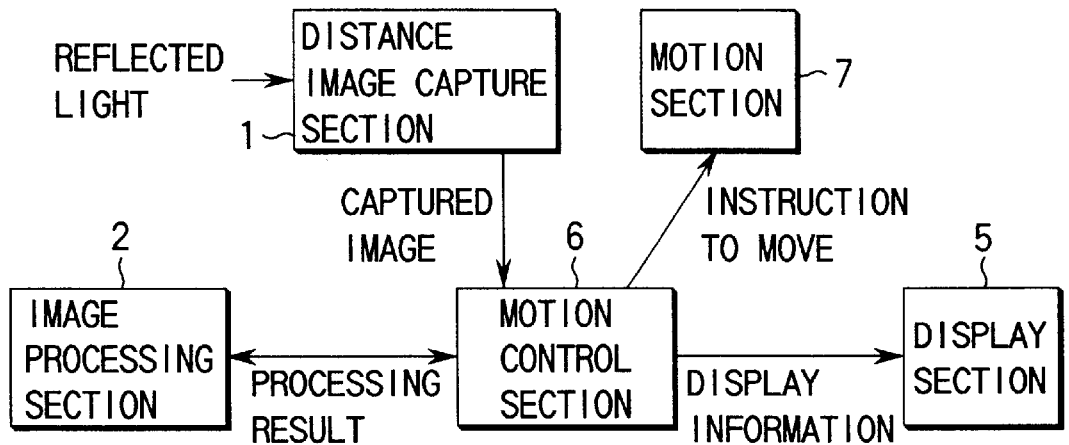
FIG. 9 is a block diagram showing another example of the constitution of a motion control apparatus according to the first embodiment of the present invention.

Furthermore, in the first embodiment, the motion control apparatus is incorporated into a robot, and the robot simply runs by itself so as to follow the motion of a target within a fixed distance. The present invention is not necessarily limited to this. For example, as shown in FIG. 9, the self-running control section 3 and self-running section 4 shown in FIG. 1 can be replaced with a motion control section 6 and a motion section 7, respectively to cause a robot to perform an operation, such as singing, nodding, and shaking its head as well as self-running.

Moreover, the motion control section 6 can control the motion section 7 such that the robot makes the same as a person's motion detected from about thirty distance images captured per second by the distance image capture section 1.

A continuous pattern of each of desired gestures (singing, nodding, shaking, etc.) can be stored in advance in the recognition dictionary, and a robot's motion corresponding to each of the gestures can be stored. When time-series contour information extracted from time-series distance image coincides with the continuous pattern of a desired gesture stored in the recognition dictionary (or when a person makes the same motion as that stored in the recognition dictionary), the motion control section 6 controls the motion section 7 to cause the robot to make a motion corresponding to the gesture (sing, nod or shake its head).

A user can cause the robot to memorize his or her own gesture. For example, an image of a user's gesture is captured by the distance image capture section 1, a CCD camera and the like and stored in the recognition dictionary as a recognition pattern. As described above, when a motion corresponding to the recognition pattern is detected from the time-series distance image, the robot makes a predetermined motion corresponding to the pattern.

If a marker having a large reflection coefficient is attached to a target object, a distance image of the object can easily be captured even from a long distance by the distance image capture section 7.

The motion control apparatus having the constitution shown in FIG. 9 can be incorporated into a wheelchair. In this case, the motion section 7 is a mechanical section for driving the wheelchair. An obstacle present in the moving direction of the wheelchair is detected and a distance from the wheelchair to the obstacle is measured from the distance image captured by the distance image capture section 1. If the obstacle exists within a predetermined distance from the wheelchair, the motion control section 6 controls the motion section 7 to change the moving direction to avoid the obstacle or stop the wheelchair.

According to the present invention, a wearable object detection apparatus which has such size and weight as not to apply a load to any person, can be achieved.

Figure 16:
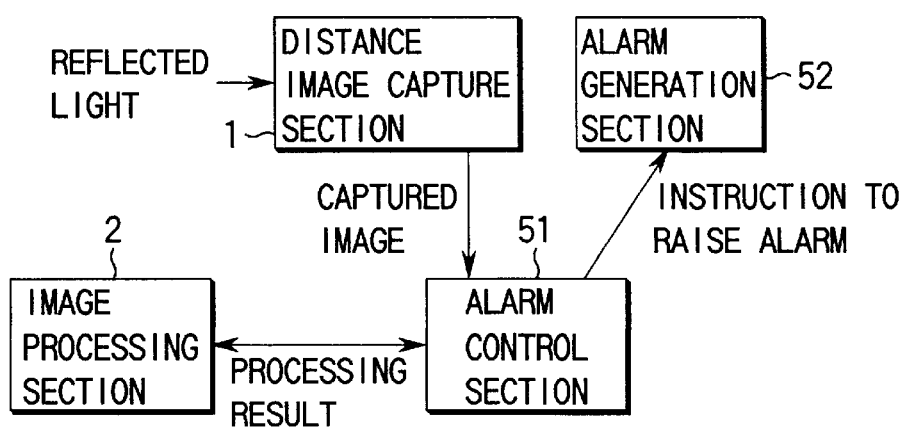
FIG. 16 is a block diagram illustrating an example of the constitution of a wearable object detection apparatus which can be worn by the blind.

FIG. 16 illustrates an example of a wearable object detection apparatus which can be worn by a handicapped person. In FIG. 16, the same constituting elements as those in FIG. 1 are denoted by the same reference numerals. The apparatus illustrated in FIG. 16 includes a distance image capture section 1, an image processing section 2, an alarm control section 51, and an alarm generation section 52. The image processing section 2 detects an object and a difference in level such as stairs (called obstacles) which prevent a person from advancing, and calculates a distance from the person to the obstacle, from the distance image captured by the distance image capture section 1. When an obstacle falling within a predetermined distance from the person is detected, the alarm control section 51 gives an instruction to generate an alarm to the alarm generation section 52.

A person who wears the wearable object detection apparatus shown in FIG. 16 can know an obstacle in its moving direction by an alarm generated by the alarm generation section 52.

The alarm is not limited to a simple beep but can be a message "A car is parked two meters ahead."

Second Embodiment

The foregoing first embodiment has a problem that the distance image is difficult to capture from a long distance since it is captured using reflected light. The second has another problem that the distance image can be obtained but its color information cannot be captured since it is reflected light. In order to resolve these problems, a two-dimensional image, which can be captured by a normal camera such as a CCD camera, can be used in addition to the distance image captured by the distance image capture section 1.

A motion control apparatus employing an object detection apparatus having the distance image capture section 1 and a two-dimensional image capture section 22 such as a normal CCD camera for capturing a two-dimensional image, will now be described.

Figure 10:
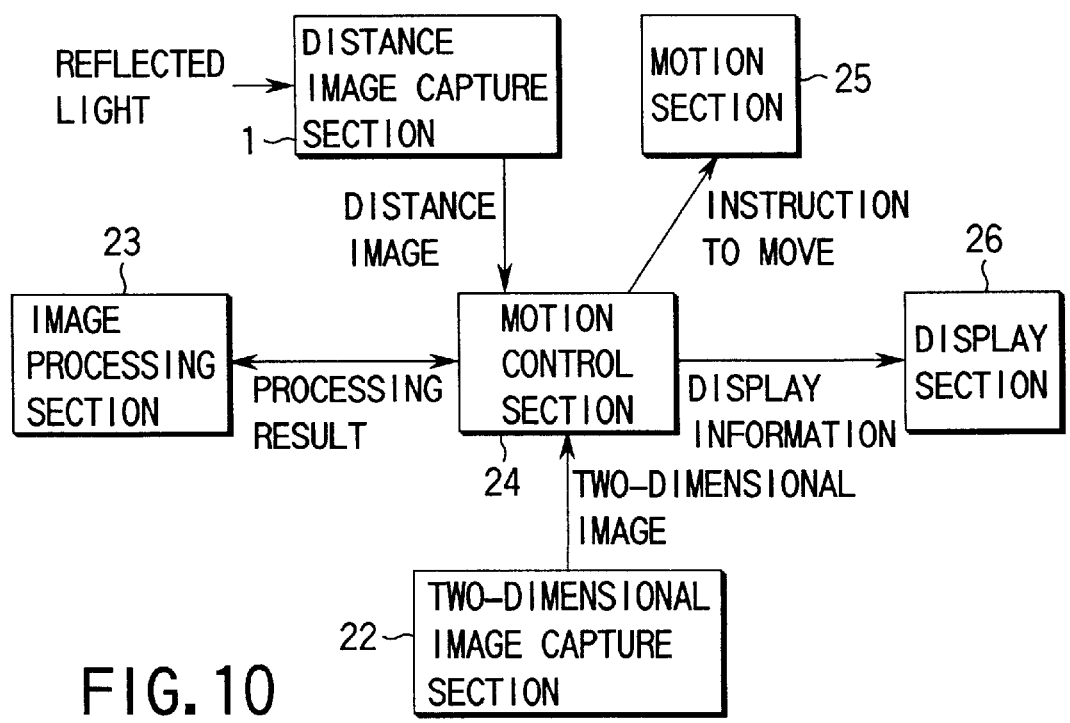
FIG. 10 is a block diagram illustrating an example of the constitution of a motion control apparatus according to a second embodiment of the present invention.

FIG. 10 is a block diagram showing an example of the constitution of a motion control apparatus according to a second embodiment of the present invention.

The apparatus shown in FIG. 10 is incorporated into a robot or the like and includes a distance image capture section 1, a two-dimensional image capture section 22, an image processing section 23, a motion control section 24, a motion section 25 and a display section 26.

The two-dimensional image capture section 22 captures a two-dimensional image which is similar to a normal photo image not including information of distance to a subject is captured by a CCD camera.

The image processing section 23 analyzes the distance image captured by the section 1 and the two-dimensional image captured by the section 22 to extract a target object and calculate a distance to the object.

The motion control section 24 provides the motion section 4 with an instruction to set a motion parameter based on the analysis result of the image processing section 23.

The motion section 25 causes the body (such as a robot) to make a motion, such as self-running, singing, nodding, shaking its head, and make the same motion as a person's gesture, in response to the instruction from the motion control section 24.

The display section 26 is constituted of, e.g., a small-sized liquid crystal panel for displaying a result of image processing and a status of the motion.

An operation of the motion control apparatus shown in FIG. 10, which runs by the motion section 25 as in the first embodiment, will now be described.

The motion control apparatus can be incorporated into a robot having a shape as shown in FIG. 5.

Figure 11:
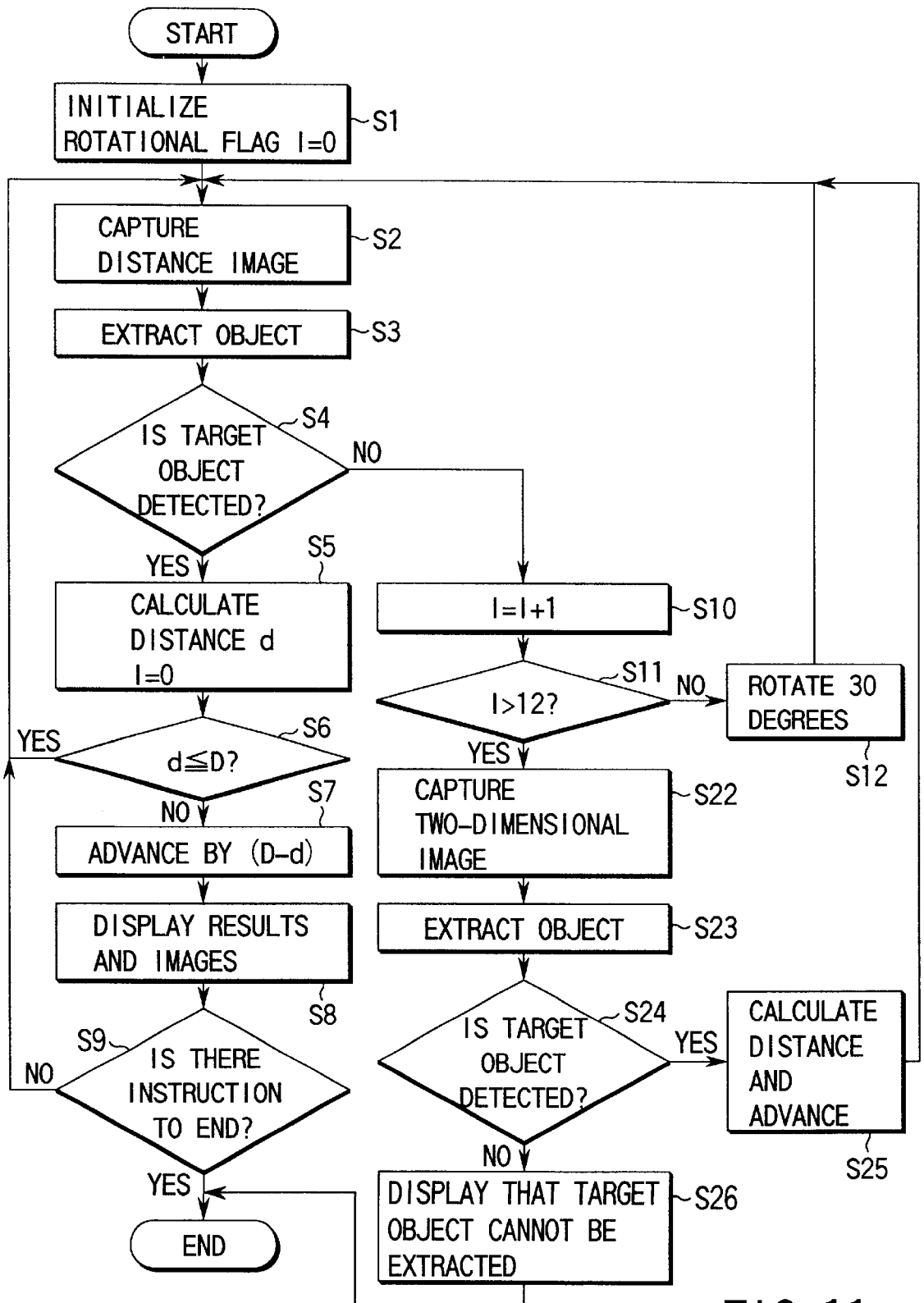
FIG. 11 is a flowchart for explaining an operation of the motion control apparatus illustrated in FIG. 10.

Referring to the flowchart of FIG. 11, the image processing operation of the motion control apparatus having the constitution shown in FIG. 10 will be described. In FIG. 11, the same constituting elements as those in FIG. 8 are indicated by the same reference numerals, and only different elements will be described below.

Figure 8:
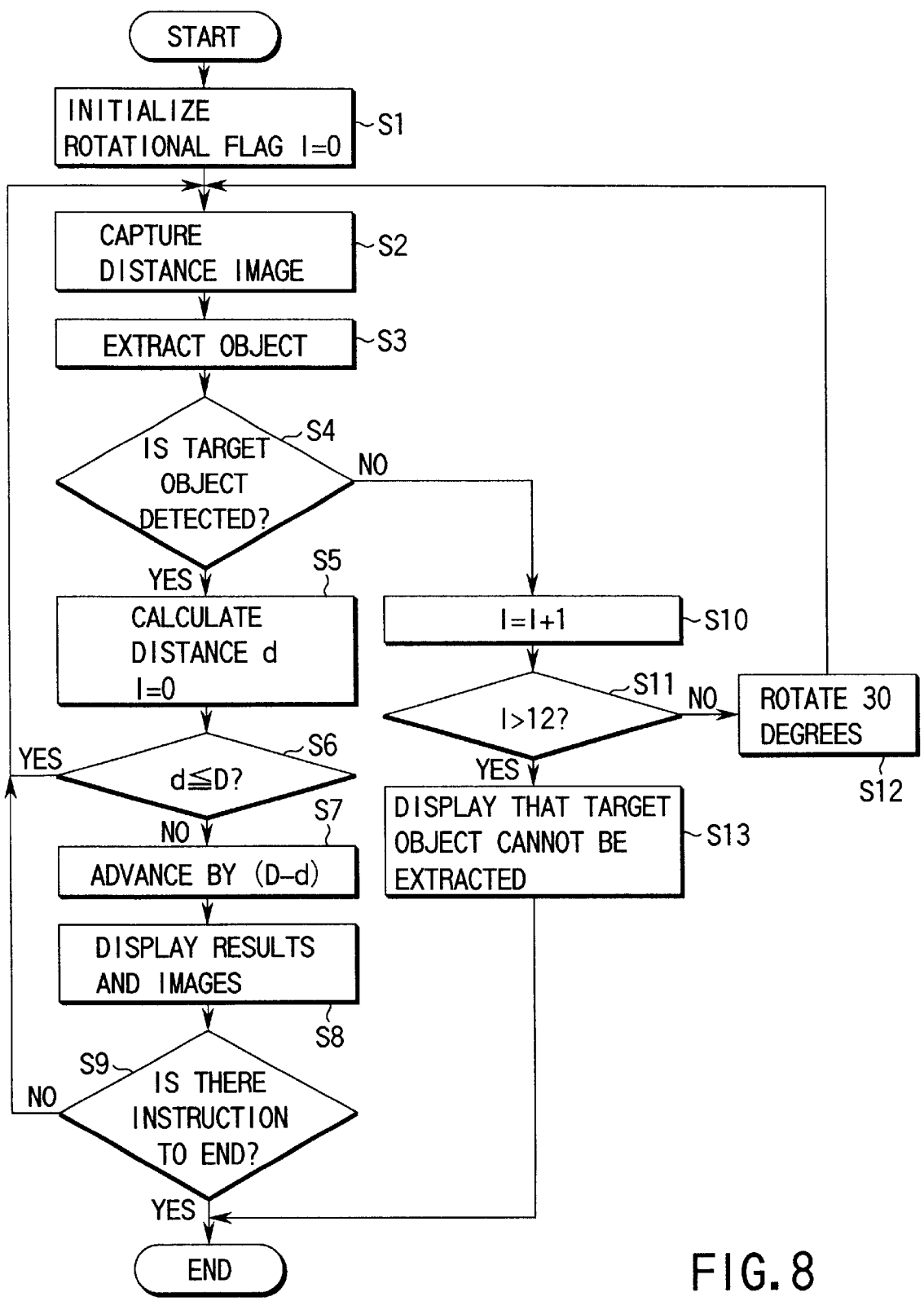
FIG. 8 is a flowchart for explaining an operation of the motion control apparatus illustrated in FIG. 1.

In FIG. 11, the image processing operation performed when a target object is detected from the distance image from steps S1 to S9, is the same as that in FIG. 8.

Since, in the second embodiment, it is assumed that the motion control apparatus of FIG. 10 moves within a relatively narrow range, the distance image capture section 1 is used mainly rather than the two-dimensional image capture section 22. On the contrary, when the apparatus moves within a large range, the section 22 is mainly used because it is good at capturing an image in the distance. For this reason, the flowchart of FIG. 11 is slightly different from that of FIG. 1, which will be described later.

If, in step S4, no target object can be detected, "1" is added to a rotational flag I (step S10) as in the case of FIG. 8. When the rotational flag I is smaller than "12," the flow goes to step S12, and the motion control section 24 gives the motion section 25 an instruction to rotate the robot (steps S11 and S12). The motion control section 24 rotates the (body) robot such that it looks around its surroundings until a target object is detected from a distance, captures the distance image and searches for the target object.

When the target object is in a distant place, it cannot be found only by the search for the neighborhood of the robot body by the distance image capture section 1. If, in step S11, no target object can be detected though the robot rotates once, the flow moves to step S22, and a two-dimensional image (which can be a color image or a monochrome image, but is regarded as a former one in the second embodiment) is captured by the two-dimensional image capture section 22. More specifically, the section 22 starts to search for a target object which is so far away from the robot that a distance image cannot be captured by the distance image capture section 1.

Then the image processing section 23 extracts the target object from the two-dimensional image captured by the two-dimensional image capture section 22 (step S23). This processing can be made equal to the conventional image processing. If the target object is a person, his or her flesh color portion is extracted from the captured two-dimensional image (color image). In the image processing section 2 of the first embodiment, pattern matching is performed using the recognition dictionary shown in FIG. 7; however, in this case, the person is in the distant place and thus it is difficult to extract the exact shape of his or her hand or face. If the flesh color portion is simply detected, the motion control section 24 determines that the target object is found and controls the motion section 25 to move the robot toward the detected flesh color portion by a predetermined distance (steps S24 and S25). After the robot moves by the distance, the flow returns to step S2 and then the subsequent processing is repeated. The precise matching for detecting the target object has only to be performed when the distance image is captured again after step S2.

If the robot does not approach the target object sufficiently in step S25, the target object is not detected from the distance image in step S4. Therefore, the two-dimensional image is captured and processed again (steps S10, S11 and S22) and then the robot advances again in step S25.

If, in step S24, the target object cannot be detected from the two-dimensional image, the result is displayed on the display section 26 to complete the processing (step S26).

As in the foregoing first embodiment, the motion section 25 causes the robot to perform an operation, such as singing, nodding, and shaking its head as well as self-running.

The motion control section 24 can control the motion section 25 such that the robot makes the same as a person's motion detected from about thirty distance images captured per second by the distance image capture section 1.

A continuous pattern of each of desired gestures (singing, nodding, shaking, etc.) can be stored in advance in the recognition dictionary, and a robot's motion corresponding to each of the gestures can be stored. When time-series contour information extracted from time-series distance image coincides with the continuous pattern of a desired gesture stored in the recognition dictionary (or when a person makes the same motion as that stored in the recognition dictionary), the motion control section 24 controls the motion section 25 to cause the robot to make a motion corresponding to the gesture (sing, nod or shake its head).

A user can cause the robot to memorize his or her own gesture. For example, an image of a user's gesture is captured by the distance image capture section 1, a CCD camera and the like and stored in the recognition dictionary as a recognition pattern. As described above, when a motion corresponding to the recognition pattern is detected from the time-series distance image, the robot makes a predetermined motion corresponding to the pattern.

According to the second embodiment as described, in order to distinguish an object in a distant place and acquire color information, an image corresponding thereto is captured and combined with a distance image to detect a target object or its motion. The object can thus be detected with high precision.

In the second embodiment, the search for a target object using the captured two-dimensional image is performed in one direction. The present invention is not necessarily limited to this. As in the case of capture of the distance image, when the robot fails in detecting the target object in one direction, it can rotate and search for the object again in another direction.

In the second embodiment, different image capture sections are used for capturing images in the distance and neighborhood. The present invention is not always limited to this. For example, the two-dimensional image capture section 22 is used for calculating a temporary position of the robot for moving it toward the target object, while the distance image capture section 1 are done for exactly cutting out the target object and recognizing a gesture.

In the second embodiment, two image capture sections 1 and 22 are employed. The present invention is not however necessarily limited to this. For example, a plurality of distant image capture sections 1 whose LEDs vary in amount of emitted light are prepared, and one of the sections 1 having a large amount of emitted light is used for capturing a distance image in the distance, while the other section having a small amount of emitted light is used for capturing a distance image in the neighborhood. In step S5 of the flowchart shown in FIG. 11, when the distance to the target object is smaller than a predetermined value, the latter distance image capture section can be used and, when the distance is larger, the latter section can be switched to the former one. In this case, the number of images captured per second by the distance image capture section for capturing a distance image in the distance can be decreased without changing the amount of light emitted therefrom.

Moreover, a plurality of distance image capture sections 1 can be prepared to capture the surrounding distance images of the robot body at once without any rotation (steps S10, S11 and S12 in FIG. 11). Similarly, a plurality of two-dimensional image capture sections 22 can be prepared to capture the surrounding distance images of the robot body at once without any rotation.

Since it is assumed that the motion control apparatus of FIG. 10 moves within a relatively narrow range, the flowchart of FIG. 11 shows that the distance image capture section 1 is used mainly rather than the two-dimensional image capture section 22. On the contrary, when the apparatus moves within a large range, the section 22 is mainly used because it is good at capturing an image in the distance.

In this case, first, the robot rotates around the target object and searches therefor. When the robot detects the object, it advances in which direction the object is detected and then captures a distance image and calculates a distance to the target object as in steps S2 to S9 shown in FIG. 11.

Third Embodiment

An object detection apparatus according to a third embodiment of the present invention is designed to prevent a distance image capture section 1 from being broken by mistake when it is applied to recreational facilities such as an experience-type game.

When the object detection apparatus is applied to an experience-type game machine for enjoying a game so as to experience boxing, tennis, batting, etc. using a glove, a racket and a bat, the distance image capture section 1 is located in a position capable of capturing an image of an object such as a user's hand, ball or bat. Thus, because of the relationship in position thereof, a user is so absorbed in the game that he or she hits and breaks the distance image capture section 1 with the hand, ball or bat by mistake.

Figure 12:
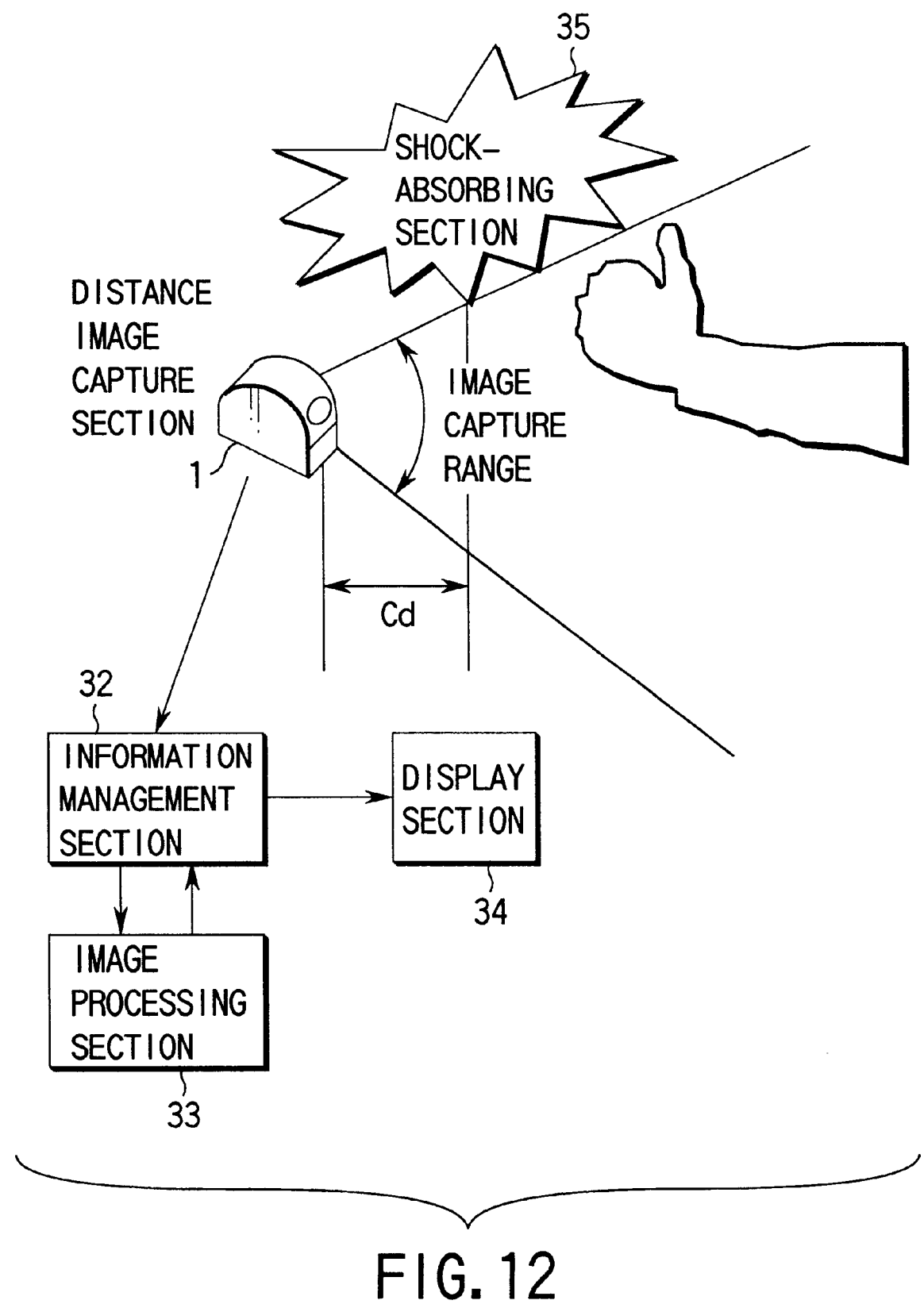
FIG. 12 is an illustration of the constitution of an object detection apparatus according to a third embodiment of the present invention, together with an example of its applicability.
Figure 13:
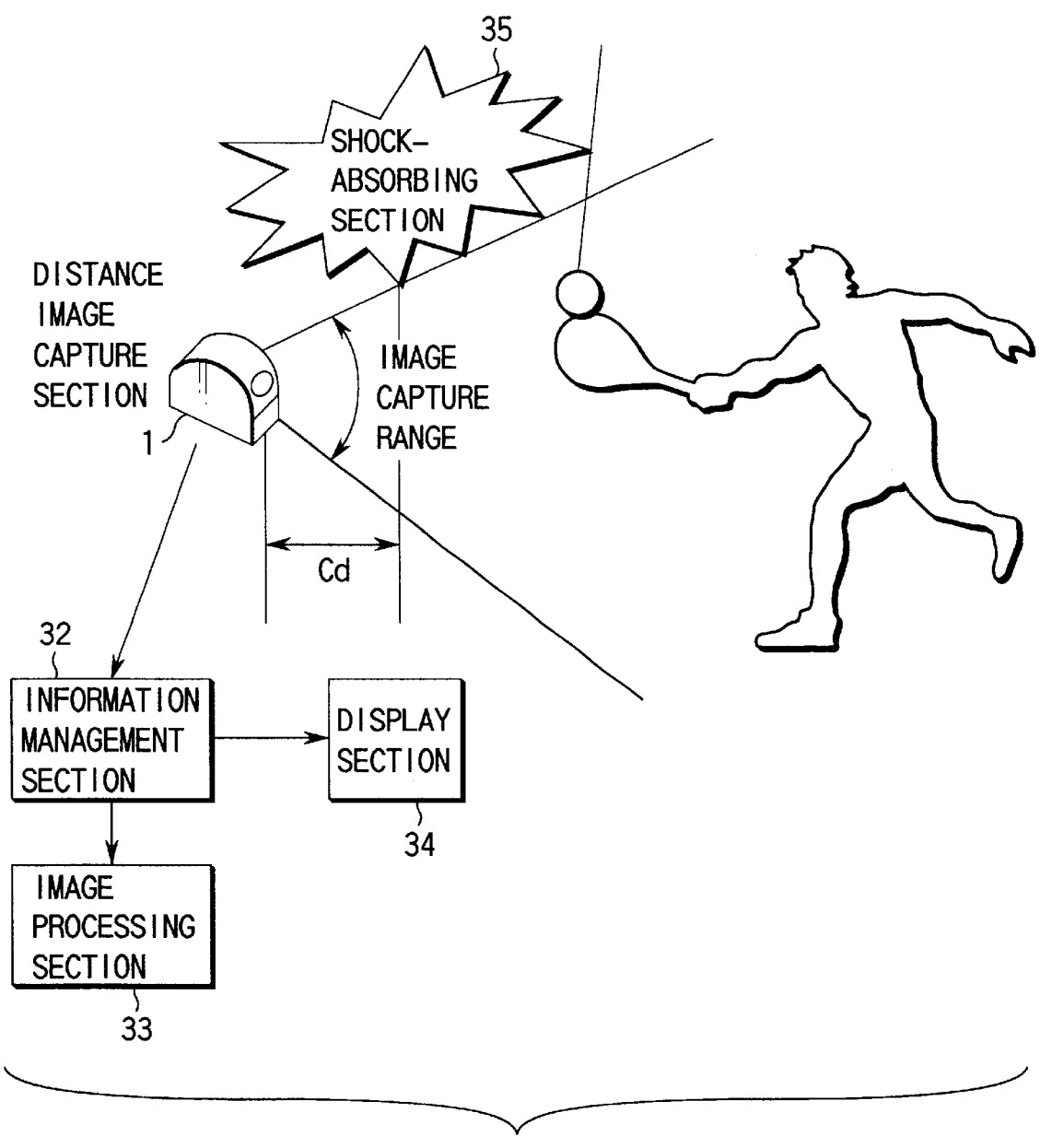
FIG. 13 is an illustration of another example of applicability of the object detection apparatus shown in FIG. 12.

FIG. 12 illustrates an example of the constitution of the object detection apparatus according to the third embodiment. The apparatus includes a distance image capture section 1, an information management section 32, an image processing section 33, a display section 34, and a shock absorbing section 35.

The information management section 32 controls the distance image capture section 1, image processing section 33 and display section 34. For example, a distance image captured by the section 1 is sent to the section 33. Based on information obtained from the processing (extraction of a target object from the distance image and that of motion of the object) of the distance image in the image processing section 33, determination processing suitable for the game machine is executed and its result is displayed on the display section 34.

The display section 34 is constituted of a small-sized liquid crystal panel and the like.

The shock absorbing section 35 is located close to a limited image capture range Cd capable of capturing an image by the distance image capture section 1. It is desirable that the location of the section 35 be beyond a viewing angle (image capture range) in which the section 1 can capture a distance image.

Assume that the above object detection apparatus is applied to a boxing game and a user's hand as an object is stretched out toward the shock absorbing section 35. In this case, the stretched hand is blocked by the section 35 and thus does not bump against the distance image capture section 1. If the object is applied to a tennis game or a batting game, a ball, as an object, hangs in front of the shock absorbing section 35. In this case, even though the ball is hit with a racket or a bat, it is blocked by the section 35 and thus does not bump against the section 1.

The distance image captured by the distance image capture section 1 is supplied to the image processing section 33 via the information management section 32. The image processing section 33 analyzes the motion of a user's arm and the movement of the ball and sends their analysis results to the information management section 32. Based on the results, the section 32 decides a win or a loss for each game and displays its decision on the display section 34.

According to the third embodiment described above, when the object detection apparatus of the present invention is applied to recreational facilities such as an experience-type game, not only the distance image capture section 1 can be prevented from being hit or broken by mistake, but also an object such as a user's hand, body and bat does not prevent normal processing because the object does not fall within the image capture range.

If the shock absorbing section 35 is constituted of moderately elastic materials, a user can feel as if he or she hit a ball.

In the foregoing third embodiment, it is assumed that the shock absorbing section 35 is constituted of opaque materials. However, the present invention is not necessarily limited to this.

If the materials of the section 35 are transparent enough to transmit light, it can be provided within the image capture range of the distance image capture section 1. More specifically, a transparent acrylic plate or an elastic bag made of transparent materials and filled with air can be used as the shock absorbing section 35 and located within the limited image capture range Cd from the front of the distance image capture section 1, thereby preventing the section 1 from being hit by a user's hand, a ball or the like by mistake.

Fourth Embodiment

The object detection apparatus of the present invention can also be applied to a pattern recognition apparatus for recognizing characters or letters.

Figure 14:
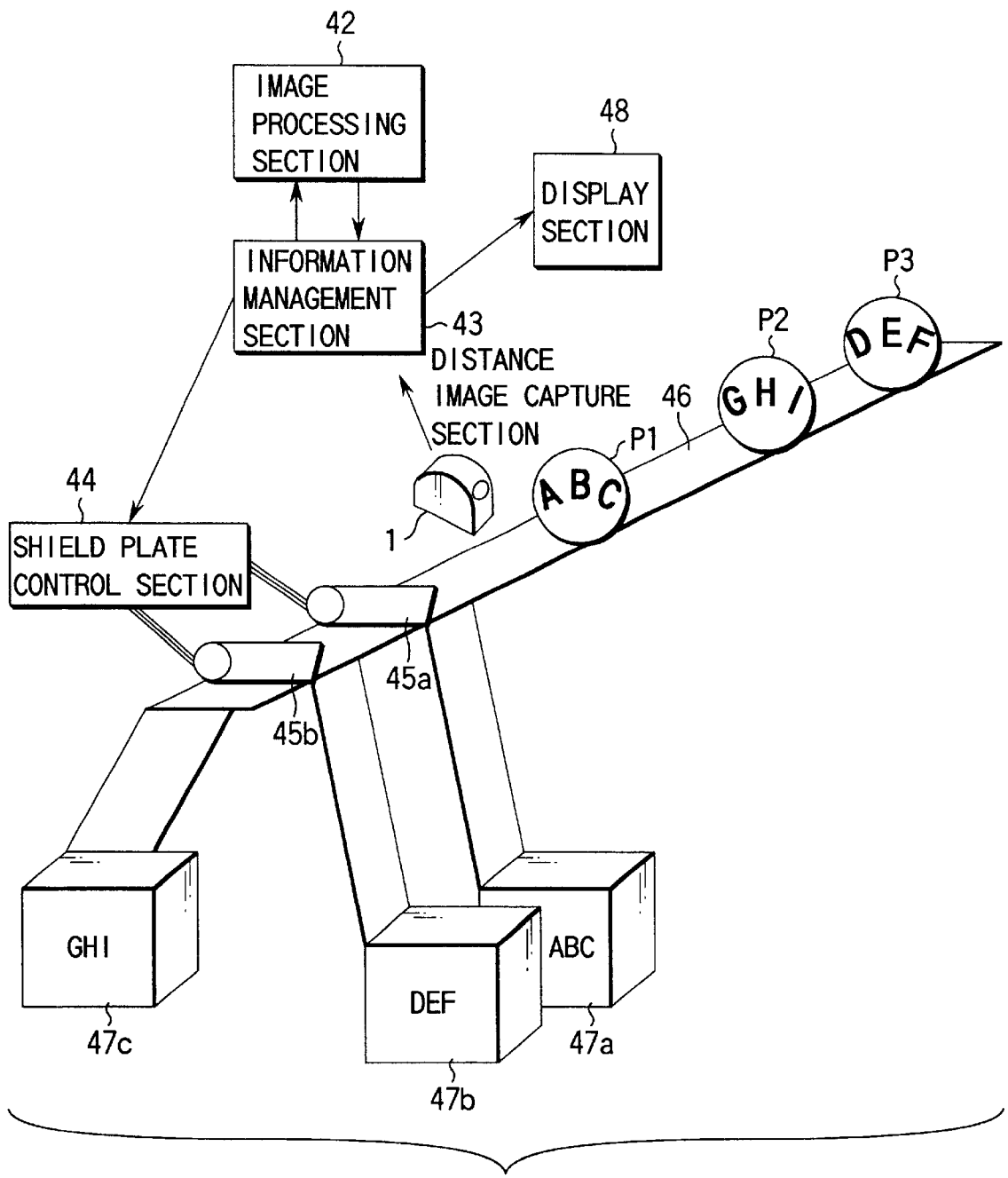
FIG. 14 is a block diagram showing an example of the constitution of a sorting apparatus according to a fourth embodiment of the present invention.

FIG. 14 illustrates an example of the constitution of a sorting apparatus provided on a production line. The apparatus is designed to recognize characters using a distance image and sort products by the recognition results.

As illustrated in FIG. 14, products P1, P2 and P3 are transferred on a transfer path 46 constituted of a conveyor belt or the like. In FIG. 14, the products are spherical and their surfaces are printed with letters such as "ABC," "GHI" and "DEF" according to their destinations.

The sorting apparatus includes a distance image capture section 1. The section 1 captures a distance image of the products on the transfer path 46 and recognizes the letters extracted from the distance image in order to sort the products.

The distance image capture section 1 is fixed in a predetermined position such that it can capture a distance image of each of products transferred in sequence on the transfer path 46.

The surface of the products and the letters "ABC," "GHI" and "DEF" printed thereon differ in reflectivity of light emitted from the distance image capture section 1.

The image processing section 42 extracts the letters from the distance image captured by the distance image capture section 1 according to a difference in intensity between the light reflected by the surface of the products and the light reflected by the letters printed thereon. When the reflectivity of the light reflected by the letters is lower, pixels having small values are removed from the distance image to extract the letters. By pattern matching using the extracted letters and the previously-stored letter dictionary, the letters are recognized and its results are sent to the information management section 43.

The information management section 43 controls the distance image capture section 1, image processing section 42 and display section 48. The section 43 sends an image captured by the section 1 to the section 42, and gives a shield plate control section 44 an instruction to sort the objects on the transfer path 46 based on letter recognition results obtained by the section 42. Furthermore, the section 43 can cause the display section 48 to display the letter recognition results and the destinations of the sorted products according to the results.

The sorting is performed as follows. Shield plates 45a and 45b provided on the transfer path 46 are raised and tilted in response to the instruction of the shield plate control section 44, and the products are guided to sorting boxes 47a to 47c according to the letter recognition results.

If the location of the distance image capture section 1 is fixed and so is the image capture position of the products on the transfer path 46 (for example, an image is captured by the section 1 when a sensor located in a predetermined position senses the products passing by), the distance from the section 1 to the products can definitely be predicted in advance.

In the captured distance image of the letters printed on the surface of a sphere, the letter printed on the central part of the sphere and the letter printed on the periphery thereof are different in intensity of reflected light since these letters are not on the same plane. Therefore, the letters will be distorted on the captured distance image.

If a product is a sphere having a predetermined measure, the position of letters printed on the surface is preset, and the image capture direction thereof is fixed, an amount of distortion (difference in intensity of reflected light) can be estimated according to a difference in distance between the central part of the sphere and the peripheral part thereof. Consequently, the image processing section 42 corrects the intensity (pixel value) of reflected light which is predicted from the distortion of the letters; therefore, the letters can be extracted more exactly.

Figure 15:
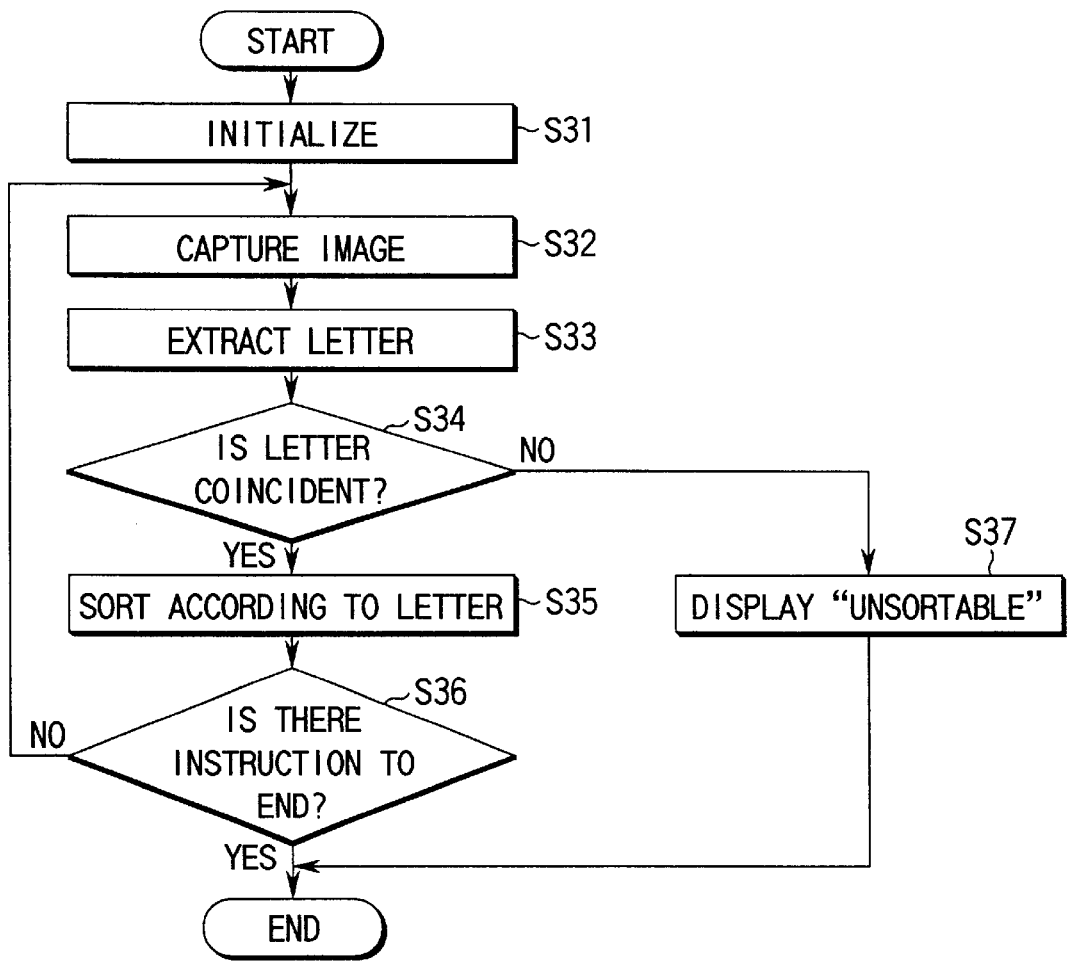
FIG. 15 is a flowchart for explaining an operation of the sorting apparatus of FIG. 14.

An image processing operation of the sorting apparatus of FIG. 14 will now be described, with reference to the flowchart shown in FIG. 15.

First when power is turned on to start the sorting apparatus in response to an instruction, it performs a predetermined initializing operation to drive the transfer path 46 (step S31).

The distance image capture section 1 captures distance images of products P1 to P3 transferred in sequence on the transfer path 46 (step S32). The image processing section 42 extracts pixels having different reflectivities (the reflectivity of a printed letter is low and thus the pixel value P(i, j) is smaller than a predetermined one) from the distance images captured by the section 1 and then letters (step S33). In this case, the pixel value corresponding to the above distortion of letters can be corrected.

The image processing section 42 checks whether the extracted letters coincides with any of letter patterns "ABC," "GHI" and "DEF" to be recognized in the previously-stored letter dictionary, and notifies the information management section 43 of the result.

When the letter dictionary includes a letter pattern which coincides with the extracted letters with respect to previously-allowed similarity, the shield plate control section 44 operates a shield plate in such a manner that a product printed with the letters is supplied to a sorting box corresponding to the letters (steps S34 and S35).

When the letter dictionary does not include any letter pattern which coincides with the extracted letters, a message "UNSORTABLE" is displayed on the display section 48 (step S37), and the processing ends. When no products are supplied or no letters are detected in the captured distance image even after a lapse of a fixed period of time, the information management section 43 can determine that the sorting apparatus is stopped and give an instruction to complete the processing (step S36).

According to the fourth embodiment described above, a pattern such as letters can clearly be recognized, based on a difference in reflectivity between target objects within the same distance, using a distance image. Based on the results of the recognition, a complicated operation such as sorting according to product numbers and sorting depending upon whether a coating finish is good or bad, can be performed, which greatly contributes to automation of a manufacturing process.

In the above fourth embodiment, the reflectivity of letters printed on the product surface is set lower than that of the product surface itself. The present invention is not limited to this. For example, when the surface of a product has a color (e.g., black) whose reflectivity is low, a letter to be recognized has only to be printed thereon with ink of high reflectivity (e.g., silver ink).

In the fourth embodiment, the letters are printed on the surface of the product. The present invention is not limited to this. For example, a one-dimensional bar code, a second-dimensional bar code and the other special symbols can be printed thereon.

The present invention is not limited to the above embodiments. Various changes and modifications can be made within a technical scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An object detection apparatus, comprising:

an image capture device configured to capture a distance image of an object in a single image capture direction, said distance image being configured by a plurality of pixel data indicative of a distance to and a three-dimensional shape of the object, the image capture device including a light-emitting device emitting light, a light-receiving device receiving a first amount of light not including light reflected by the object when the light-emitting device emits light, receiving a second amount of light when the light-emitting device does not emit light, and receiving a third amount of light when the light-emitting device emits light onto the object, a first subtracting device subtracting the second amount of light from the first amount of light ahead of capturing the distance image to obtain a fourth amount of light and a second subtracting device subtracting the fourth amount of light from the third amount of light to obtain the distance image;

an object extraction device configured to extract the shape of the object based on the pixel data from the distance image thereby obtaining an extracted object; and a detection device configured to detect at least one of the object and a motion of the object from the shape of the extracted object.

2. An object detection apparatus, comprising:

at least one first image capture device configured to capture a distance image of an object in a single image capture direction, the distance image being configured by a plurality of pixel data indicative of a distance to and a three-dimensional shape of the object, the image capture device including a light-emitting device emitting light, a light-receiving device receiving a first amount of light not including light reflected by the object when the light-emitting device emits light receiving a second amount of light when the light-emitting device does not emit light and receiving a third amount of light when the light-emitting device emits light onto the object, a first subtracting device subtracting the second amount of light from the first amount of light ahead of capturing the distance image to obtain a fourth amount of light, and a second subtracting device subtracting the fourth amount of light from the third amount of light to obtain the distance image;

an object extraction device configured to extract the shape of the object based on the pixel data from the distance image captured by said at least one first image capture device thereby obtaining an extracted object;

at least one second image capture device configured to capture an image which differs in property from the distance image; and a detection device configure to detect at least one of the object and a motion of the object based on at least one of the shape of the extracted object and the image captured by the at least one second image capture device.

3. The object detection apparatus according to claim 2, wherein the at least one first image capture device and the at least one second image capture device vary from each other in image capture range.

4. The object detection apparatus according to claim 2, wherein the image captured by the at least one second image capture device is a two-dimensional image.

5. An object detection apparatus, comprising:

a plurality of image capture devices each configured to capture a distance image of an object in a single image capture direction, the distance image being configured by a plurality of pixel data indicative of a distance to and a three-dimensional shape of the object, each of the plurality of image capture devices including a light-emitting device emitting light, a light-receiving device receiving a first amount of light not including light reflected by the object when the light-emitting device emits light, receiving a second amount of light when the light-emitting device does not emit light, and receiving a third amount of light when the light-emitting device emits light onto the object, a first subtracting device subtracting the second amount of light from the first amount of light ahead of capturing the distance image to obtain a fourth amount of light, and a second subtracting device subtracting the fourth amount of light from the third amount of light to obtain the distance image;

an object extraction device configured to extract the shape of the object based on the pixel data from the distance image captured by at least one of the plurality of the image capture devices thereby obtaining an extracted object; and a detection device configured to detect at least one of the object and a motion of the object from the shape of the extracted object.

6. The object detection apparatus according to claim 5, wherein the plurality of image capture devices vary from one another in image capture range.

7. The object detection apparatus according to claim 5, wherein the plurality of image capture devices vary from one another in image capture direction.

8. An object detection apparatus, comprising:

an image capture device configured to capture a distance image of an object in a single image capture direction, the distance image being configured by a plurality of pixel data indicative of a distance to and a three-dimensional shape of the object, the image capture device including a light-emitting device emitting light, a light-receiving device receiving a first amount of light not including light reflected by the object when the light-emitting device emits light receiving a second amount of light when the light-emitting does not emit light, and receiving a third amount of light when the light-emitting device emits light onto the object, a first subtracting device subtracting the second amount of light from the first amount of light ahead of capturing the distance image to obtain a fourth amount of light, and a second subtracting device subtracting the fourth amount of light from the third amount of light to obtain the distance image;

an object extraction device configured to extract the shape of the object based on the pixel data from the distance image thereby obtaining an extracted object;

a detection device configured to detect at least one of the object and a motion of the object from the shape of the extracted object; and an alarm generation device configured to generate an alarm when the detection device detects the at least one of the object and the motion of the object.

9. The object detection apparatus according to claim 8, wherein the apparatus is wearable.

10. A motion control apparatus applied to another apparatus, comprising:

an image capture device configured to capture a distance image of an object in a single image capture direction, the distance image being configured by a plurality of pixel data indicative of a distance to and a three-dimensional shape of the object, the image capture device including a light-emitting device emitting light, a light-receiving device receiving a first amount of light not including light reflected by the object when the light-emitting device emits light, receiving a second amount of light when the light-emitting device emits light onto the object, a first subtracting device subtracting the second amount of light from the first amount of light ahead of capturing the distance image to obtain a fourth amount of light and a second subtracting device subtracting the fourth amount of light from the third amount of light to obtain the distance image;

an object extraction device configured to extract the shape of the object based on the pixel data from the distance image to obtain an extracted object;

a detection device configured to detect at least one of the object and a motion of the object from the shape of the extracted object; and a control device configured to control the motion of the another apparatus based on a result of detection of the detection device.

11. A motion control apparatus applied to another apparatus, comprising:

at least one first image capture device configured to capture a distance image of an object in a single image capture direction, the distance image being configured by a plurality of pixel data indicative of a distance to and a three-dimensional shape of the object, the at least one image capture device including a light-emitting device emitting light, a light-receiving device receiving a first amount of light not including light reflected by the object when the light-emitting device emits light, receiving a second amount of light when the light-emitting device does not emit light, and receiving a third amount of light when the light-emitting device emits light onto the object, a first subtracting device subtracting the second amount of light from the first amount of light ahead of capturing the distance image to obtain a fourth amount of light, and a second subtracting device subtracting the fourth amount of light from the third amount of light to obtain the distance image;

an object extraction device configured to extract the shape of the object based on the pixel data from the distance image captured by at least one first image capture device thereby obtaining an extracted object;

at least one second image capture device configured to capture an image which differs in property from the distance image;

a detection device configured to detect at least one of the object and a motion of the object based on at least one of the shape of the extracted object and the image captured by the at least one second image capture device; and a control device configured to control the motion of the another apparatus based on the result of detection of the detection device.

12. The motion control apparatus according to claim 11, wherein the at least one first image capture device and the at least one second image capture device vary from each other in image capture range.

13. The motion control apparatus according to claim 11, wherein the image captured by the at least one second image capture device is a two-dimensional image.

14. A motion control apparatus applied to another apparatus, comprising:

a plurality of image capture devices each configured to capture a distance image of an object in single image capture direction, the distance image being configured by a plurality of pixel data indicative of a distance to and a three-dimensional shape of the object, each of the plurality of image capture devices including a light-emitting device emitting light, a light-receiving device receiving a first amount of light not including light reflected by the object when the light-emitting device emits light receiving a second amount of light when the light-emitting device emits light, and receiving a third amount of light when the light-emitting device emits light onto the object, a first subtracting device subtracting the second amount of light from the first amount of light ahead of capturing the distance image to obtain a fourth amount of light, and a second subtracting device subtracting the fourth amount of light from the third amount of light to obtain the distance image and providing a plurality of pixel data indicative of a three-dimensional shape of the object;

an object extraction device configured to extract the shape of the object based on the pixel data from the distance image captured by at least one of the plurality of image capture device thereby obtaining an a extracted object;

a detection device configured to detect at least one of the object and a motion of the object based on the shape of the extracted object; and a control device configured to control the motion of the another apparatus based on the result of detection of the detection device.

15. The motion control apparatus according to claim 14, wherein the plurality of image capture devices vary from one another in image capture range.

16. The motion control apparatus according to claim 15, wherein the plurality of image capture devices vary from one another in image capture direction.

17. A pattern recognition apparatus, comprising:

an image capture device configured to capture a distance image of an object in a single image capture direction, the distance image being configured by a plurality of pixel data indicative of a distance to and a three-dimensional shape of the object, the image capture device including a light-emitting device emitting light, a light-receiving device receiving a first amount of light not including light reflected by the object when the light-emitting device emits light, receiving a second amount of light when the light-emitting device does not emit light, and receiving a third amount of light when the light-emitting device emits light onto the object, a first subtracting device subtracting the second amount of light from the first amount of light ahead of capturing the distance image to obtain a fourth amount of light, and a second subtracting device subtracting the fourth amount of light from the third amount of light to obtain the distance image;

an object extraction device configured to extract the shape of the object based on the pixel data and reflectivity of the object from the distance image thereby obtaining an extracted object; and a recognition device configured to recognize a predetermined pattern from the shape of the extracted object.

18. The object detection apparatus according to claim 1, wherein the image capture device is provided so as to prevent the object from falling within a limited image capture range and to prevent the image capture device from colliding with the object.

* * * * *

UNITED STATES PATENT AND TRADEMARK OFFICE
CERTIFICATE OF CORRECTION

PATENT NO.     : 6,456,728 B1
DATED          : September 24, 2002
INVENTOR(S)    : Doi et al.

It is certified that error appears in the above-identified patent and that said Letters Patent is hereby corrected as shown below:

<u>Title page,</u>
Item [45], and the Notice information should read:

-- [45] **Date of Patent:   \*Sep. 24, 2002**

[\*] Notice: This patent issued on a continued prosecution application filed under 37 CFR 1.53(d), and is subject to the twenty year patent term provisions of 35 U.S.C. 154(a)(2).

Subject to any disclaimer, the term of this patent is extended of adjusted under 35 U.S.C. 154(b) by 0 days. --

Signed and Sealed this

Fourth Day of February, 2003

JAMES E. ROGAN
*Director of the United States Patent and Trademark Office*